Figure 1:
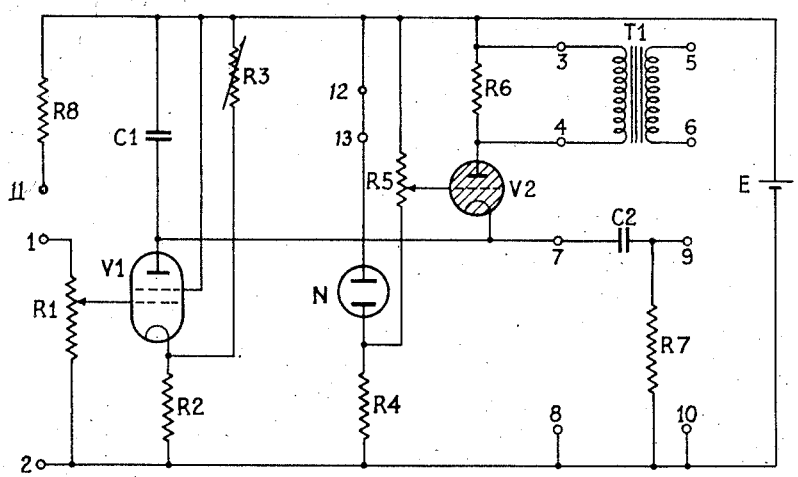

Feb. 14, 1950   B. M. HADFIELD   2,497,766
OSCILLATION GENERATOR
Filed Feb. 4, 1944

INVENTOR
BERTRAM MORTON HADFIELD

BY Chas. M. Cardy
ATTORNEY

Patented Feb. 14, 1950

2,497,766

UNITED STATES PATENT OFFICE 2,497,766

OSCILLATION GENERATOR

Bertram Morton Hadfield, Harrow Weald, England, assignor to Automatic Electric Laboratories, Inc., Chicago, Ill., a corporation of Delaware Application February 4, 1944, Serial No. 521,055
In Great Britain March 17, 1943

7 Claims. (Cl. 250—36)

The present invention has for its object the generation of waveforms repeated at regular periods of time whose frequency is controllable in a linear manner by a direct current and is substantially independent of the power supply to the apparatus. The waveform may be of impulse type having a short duration compared to the repetition period, or may have linear rates of change for substantial portions of the period.

It has been proposed to produce sawtooth oscillations having a fundamental frequency which can be controlled through variation of a direct current potential by employing a condenser connected across a source of direct current in series with a thermionic valve, whereby the charging of the condenser may be effected at a uniform rate which may be varied in accordance with the magnitude of a control voltage impressed on a grid of the valve, and means connected across the condenser for discharging it when it becomes charged to a predetermined potential. It is an object of the present invention to provide such an oscillation generator wherein the frequency bears a linear relation to the direct current control voltage and for this purpose it is essential to correct for the fact that there is normally a current flow through the valve when the control potential is zero.

According to the invention an oscillation generator is provided in which the condition of a reactance as regards its charged or energized condition is changed at a uniform rate with time by providing a thermionic valve in its charging circuit, which valve is controled by an input direct current voltage applied to its grid circuit, which voltage determines the rate at which the condition is changed in a manner which is substantially linear by arranging that there is a substantially zero current for zero input potential.

According to a further subsidiary feature of the invention, the limits of charge and discharge are rendered independent of the power supply variations.

According to a subsidiary feature of the invention, the output is derived from the discharge circuit, the design of which is such that the waveform consists of a maximum of harmonic frequencies each having the same amplitude and substantially in phase one with the other.

According to a further subsidiary feature of the invention the amplitude of the oscillations is governed by the setting of a potentiometer arranged to apply a biasing potential to the control electrode of a gaseous discharge tube connected across the condenser, and which amplitiude is rendered independent of power supply variations through the connection of a further gaseous discharge tube across said potentiometer.

According to a further subsidiary feature of the invention a periodic wave of triangular waveform is obtained by rectifying the periodic wave of sawtooth waveform developed across the condenser.

In order to satisfy the main object of the invention, that the charge time is to be inversely proportional to the input control direct current voltages, then the magnitude of the rate of charge expressed as a function of time must be proportional to the input control voltage and independent of the actual charging function itself. The simplest practical way of achieving this result is to make the rate of charge with time and the final charge both constant; for if the former is not constant with time then the latter will have to vary in some manner dependent on the control voltage. If a capacity be used as the reactance, then this means that the charge current must be constant with time and its magnitude proportional to the control voltage, both independently of the actual charge function, whilst the charging voltage limits must be constant. If an inductance be used as the reactance, then the charge voltage must be constant with time and of magnitude proportional to the control voltage, both being independent of the actual charge function, whilst the charging current limits must be constant. It is easier to use a capacity than an inductance because the residuals of the former are less than the latter, and because it is easier to control limits of voltage than limits of current. An embodiment of the invention will therefore now be described utilising a capacity as the reactance, but alternative circuits using an inductance are possible and will be apparent to those skilled in the art, from consideration of the above statement and the following description of one method of carrying the invention into effect.

Figure 2:
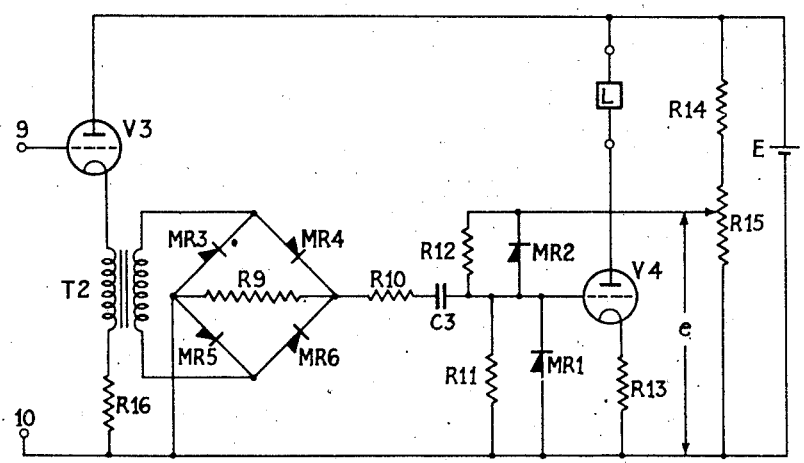

Referring to the accompanying drawings Fig. 1 illustrates the generator circuit while Fig. 2 illustrates an arrangement for reducing the harmonic content of oscillation produced by the arrangement shown in Fig. 1.

Referring to Fig. 1 a capacity $C1$ is joined between the positive busbar of the battery $E$ and the anode of a thermionic valve $V1$ whose cathode is joined to the negative pole of $E$ via a resistance $R2$. The control grid of $V1$ is taken to the arm of a potentiometer $R1$, whose ends constitute the input terminal $1$, $2$, the latter being joined to the negative busbar of E. The first requisite of the circuit of V1, is that the change of anode current should be to the greatest possible extent linear with changes of the input D.C. voltage between the control grid and the negative busbar. From this point of view, the circuit can be regarded as a cathode follower, in which the impedance of the cathode circuit forms the output load. Assuming linear valve parameters, the following equation represents the total cathode current $i$, for a positive input $e1$, where $R2$ is the cathode resistance and $\mu$, $Ra$, are the amplification factor and internal resistance of the valve considered between the control grid and the first positive electrode (i. e. the screen grid in the present case).

$$i = \frac{\mu \cdot e1 + E}{\left(\mu + 1 + \frac{Ra}{R_2}\right) R2}$$

It follows therefore if $i$ is to be linear with $e1$, that $\mu$ must be large, $Ra$ small compared with $R2$ or alternatively $$\frac{Ra}{R2}$$

small compared with $\mu$, and to get a theoretical zero intercept on the current axis the initial current due to E (when $e1$ is 0) must be eliminated. A modern H.F. pentode such as that known as EF50 satisfies the first two points if $R2$ is of the order of 10,000 ohms. To satisfy the last a positive bias of $$\frac{E}{\mu}$$

is required, when the E term vanishes in the above equation. This requires a constant current through R2 from the positive busbar, which is most easily obtained by feeding it via a high resistance such as R3 thereby avoiding the necessity of a bias battery. This resistance is the higher as $\mu$ is larger, for a given R2, hence the preference for a high $\mu$ valve such as an H.F. pentode. The initial current is not of course zero, because the parameters vary at low currents, but the important point is that this arrangement produces a characteristic which is linear over the working part of the range, and in which the linear range, if extrapolated, passes through zero. From practical experience such a result is obtained by the above processes.

In practice, of course, a portion of R3 is made variable to adjust for the differing $\mu$ values of commercial valves. In a typical setup the initial anode current with no input, was reduced from 0.2 ma. to 0.03 ma. with the aid of R3 whilst the anode current change was linear to within 0.01 ma. for positive inputs greater than 1 volt and when extrapolated passed through zero current and voltage; the rate of change being 0.067 ma./volt input.

As regards the permissible anode limits of V1 (i. e. the maximum charge voltage on C1), this depends in the well known manner on the maintenance of an anode/cathode voltage just greater than say one fifth of the minimum screen/cathode voltage, if the operation is to be confined to the normal anode characteristics of a pentode valve. It is sufficient to state that this means that the anode/negative busbar voltage must not be less than $0.2E + 0.8e1$, for the present case where $\mu$ is much larger than 1 or $$\frac{Ra}{R2}$$

If the maximum $e1$ be 10 volts (giving at least a 10:1 range which is linear, see above performance figures), and E is 130 volts, it follows that the minimum anode/negative busbar voltage can be 34 volts, and hence the charge on C1 can be up to 96 volts. In general and when E is large, the charge voltage can be up to 0.8 times the supply voltage. This permits of greater stability in the design of the discharge circuit as will now be described, as well as a greater output.

The discharge circuit comprises R6 and V2, and the latter has been taken as a gas-filled triode. Let the grid control ratio of V2 be M, so that the striking anode voltage Va is given by the following formula, where $eg$ is the negative grid/cathode bias and $a$ is a small intercept voltage constant, $$Va = M \cdot eg \pm a$$

Now let the charge voltage on C1 be Vc, and the positive busbar/grid voltage on V2 be Vg, both being negative with respect to the positive busbar. Then the negative grid/cathode voltage on V2 is $Vg - Vc$, and V2 will strike (i. e. ionise and commence the discharge) when these quantities satisfy the above equation, i. e. when $$Vc = M(Vg - Vc) \pm a$$

or $$Vc = \frac{M \cdot Vg \pm a}{M + 1}$$

and when M is large, being generally of the order of 30, we have $$Vc = Vg, \text{ if } \frac{a}{M + 1}$$

is small compared to Vg. Now $a$ is generally about 10 volts and we have already seen that Vc may be 0.8E, so that $$\frac{a}{M + 1}$$

is negligible. Hence it is clear that the charge voltage is accurately given by the bias on the grid of V2 as provided by the tap on resistance R5, so that provided this bias is rendered constant and independent of E by means of the neon lamp N, which shunts R5 in a circuit in series with R4 across the terminals of E, then the charge function is only dependent on the input control voltage $e1$. Furthermore, although the discharged voltage of C1 is not zero and is due to the ionised voltage drop on V2, this amounts only to some 20 volts and is only a small fraction of the charge voltage; in any case such a voltage drop is of the same nature as that of a neon lamp and for a given V2 will be constant.

It will be seen that the circuit is not only stable to a high degree when set up for given requirements, but that these requirements can be met easily using commercial components by adjustment of R5 and R3. As an indication of what is possible, a circuit constructed as shown in Fig. 1, adjusted to operate at 250 cycles with 10 volts input, remained within 0.5 cycles over a period of 4 hours from switching on, when compared against a standard 1000 cycles. The deviation due to variations of ±10% in the supply voltage amounted to less than 1% in frequency.

The value of the main discharge resistance R6 is not found to be greatly critical, provided its value is less than that which would give non-linearity of frequency characteristic by virtue of the constant finite discharge time. Values up to 2000 ohms have been found workable in the above specific circuit. Small values below 100 ohms have been found to produce a fictitiously low discharge voltage, presumably due to residual inductance in the connection leads, and the lack of damping with the low values. However the permissible range for R6 is adequate for most purposes.

It is a useful property of the circuit that the impedance of the generator when using the output from R6 taken from the terminals 3, 4, is substantially that of the resistance R6 owing to the requirements of a small discharge time constant. Hence the output from R6 is inherently suitable for feeding to filter circuits which need a constant matching source impedance, via for instance the transformer T1 to the terminals 5, 6.

The constant charge current through C1 is now controlled by the positive input grid-negative busbar voltage applied to V1, in a linear manner and from zero upwards. As C1 charges the anode voltage of V1 falls linearly with time and with respect to the positive busbar, provided the grid potential of V2 is large and negative with respect to its cathode potential. The arm of R5 is adjusted so that this latter state holds good until the voltage on C1 attains a value such that the combined effects of the reduced grid bias on V2 and the increased anode voltage, cause V2 to ionise and conduct. C1 then discharges rapidly via R6 and V2, to a voltage just sufficient to cause de-ionisation of V2, when the latter ceases conducting and C1 commences to charge again. The time constant C1·R6 is made negligibly small compared to the charge time, so that the periodic time of the whole event is substantially that of the charge time, and the frequency is therefore proportional to the charge current and hence to the input direct current voltage.

The charge voltage of C1 can be conveniently varied by R5 within the linear limits of anode voltage of V1, thus permitting adjustment situ for commercial tolerances on the components so as to secure a specific periodic time. The input control R1, can be used as a gain control to permit of differing rates of change of frequency with input voltage between terminals 1, 2.

The output from across R6 at terminals 3, 4 includes a mean direct current value which is proportional to the operating frequency, and may be used to register as such on a meter. Alternatively, if the alternating output is desired, a transformer T may be connected across 3, 4 to match any desired load at the secondary winding terminals 5, 6.

The output from across the anode of V1 and the negative busbar at terminals 7, 8 also contains a direct current component which may be eliminated if desired by a series condenser resistance circuit C2, R7, at terminals 9, 10, C2 being connected between 7 and 9, and R7 between 9 and 10 while 10 is connected to the negative busbar.

The waveform of the output from across R6 will be impulsive in type, having exponential form and a maximum amplitude equal to the maximum charge voltage of C1, minus the ionisation voltage of V2. The waveform is terminated non-linearly by the cessation of conduction in V2, so that its time duration is finite and constant and represents the discharge time. As this must be made small in order to obtain the desired linear relation between the input control voltage and the repetition frequency, it follows that the output when analysed for its harmonic constituents contains an infinite number of harmonic frequencies each having the same amplitude.

Fourier analysis of this repetitive waveform gives a series comprised as follows:

The current in $R6 = I = f \cdot C1 \cdot V(1 + 2 \sin B \cdot \cos B \cdot \sin Nt + 2 \cos^2 B \cdot \cos Nt)$ where $t$ varies from 0 to $2\pi$ over the periodic time, $f$ is the repetition frequency, $V$ is the maximum voltage, $B$ is given by $\tan B = N \cdot T$, where $T$ is the discharge time constant and $N$ is the order of harmonic.

This may be put in the form:

$$I = f \cdot C1 \cdot V(1 + 2 \cos B \cdot \cos(Nt - B))$$

and when $B$ is small compared to the periodic time angle of 2 radians, as in the present case, becomes $$I = f \cdot C1 \cdot V(1 + 2 \cos N(t - T)) \ldots \text{(i. e. } \tan B = B\text{)}$$

Hence we see that the output current can be regarded as having a mean D. C. component $-f \cdot C1 \cdot V$, plus an infinite number of harmonics (where the fundamental is given by $N=1$), of peak amplitude twice that of the D. C. component, and all in phase since their starting points are retarded by $T$ seconds with respect to the periodic intervals. This statement is only strictly true where the definition of B as small, resides in making $T$ less than one fifth of the periodic time say, a condition which is essential to the present apparatus. With this proviso, the statement holds good up to a numerical value for N equal to or less than one half the repetition frequency $f$; that is provided $N \cdot T \leq 0.1$ so that we can put $\tan B = B$.

Such an output can therefore be used as the source where harmonically related equal amplitude frequencies are desired. For instance it may be used in the well-known "Vocoder" reception apparatus referred to in the "Bell Laboratories Record" vol. XVIII p. 122 where the output is fed to the various frequency channels by means of channel filters and is then modulated by the received channel energy thereafter being recombined to give the original speech. The fundamental frequency as is well known, must be the same as the original pitch frequency, and this is obtained by applying to the present circuit a control direct current voltage which is proportional to the pitch frequency, and adjusting the overall gain as required, for instance by R1.

The output from across R6 may also be used as a test source for checking the frequency response of tuned amplifiers, such as radio receivers. Such devices must have an accurate frequency scale with changes in the tuning element, and must possess a bandpass characteristic at each setting so that adjacent transmissions in terms of frequency are rejected. Thus if the fundamental frequency of the output, as controlled by the direct current input is made equal to the desired separation frequency of the transmissions (for instance, 10 kilo-cycles for the medium band radio range) then the output will be equivalent to the greatest possible number of simultaneous transmissions. The receiver may then be tested not only for scale accuracy but also for adjacent channel rejection. The same process may be applied to the testing of bandpass filters used in multi-channel signalling systems, where the frequency difference between the various signals is constant. Used in conjunction with a number of bandpass filters, or a variable mean frequency bandpass filter, the output may be used for testing frequency characteristics in general.

The output waveform on C1 (terminals 7/8) can be regarded as having a uniform slope over the periodic time and an infinitely rapid reversion to its initial value of the end of the periodic time, i. e. a linear saw tooth type. The harmonic analysis of this form (without the D. C. component) is well known and is as follows, in terms of voltage:

$$V = \frac{V}{\pi}\left(\sin t - \frac{\sin 2t}{2} + \frac{\sin 3t}{3} \pm \text{etc.}\right)$$

It contains therefore 50% second harmonic, 33.3% third harmonic, and so on.

The waveform of the output from across V1 or C1 (terminals 7 and 8) with respect to the busbars, will be of saw tooth form having a constant slope with time and of frequency proportional to the control input direct current voltage. It may therefore be used as a source for the control of the time base deflection in cathode ray oscillographs in the well-known manner. It may also be used as a variable frequency oscillator for the transmission of intelligence over a medium incapable of passing satisfactorily the original direct current effect, as in tele-measurement.

As the harmonics in this waveform may give rise to difficulties in transmission or reception an additional circuit element operated from this output may be used, so that the even harmonics are eliminated, and one of the lower order odd harmonics as well.

The circuit which will perform this reduction of harmonic content in the waveform across V1 or C1 is illustrated in Fig. 2 and may be as follows: The direct current component is first eliminated as described before by the circuit C2, R7 at terminals 9, 10. Terminal 9 is connected to the grid of a cathode follower stage V3 whose anode is connected to the positive busbar and whose cathode is connected to the negative busbar via a winding of a transformer T2 and resistance R16. The resistance R16 is provided to supply a suitable grid bias for the valve V3 if the resistance of the transformer T2 is inadequate for this purpose. The secondary winding of T2 is connected to a full wave rectifier bridge MR3, MR4, MR5, MR6 having a resistance load R9 between the remaining arms. R9 therefore constitutes the load in the cathode circuit of V3, and, owing to the rectifier bridge, the waveform on R9 is a rectified version of the input to V3. That is it consists of an isosceles triangular formation of the same periodicity as the original waveform. By eliminating the direct current component the resulting triangular alternating waveform not only contains no even harmonics, but has odd components of smaller values than in the original waveform (i. e. the third is one ninth, the fifth is one twenty-fifth, etc. of the fundamental compared with corresponding values of one third, one fifth, etc. in the original). Any one of these remaining odd harmonics can be eliminated by passing the waveform through a non-linear circuit in well-known manner. For instance, if one end of R9 is connected to the negative battery busbar, and the other via a current limiting resistance R10 to a condenser C3, the voltage between the remaining side of C3 and the negative busbar will contain no direct current component and may be connected over a shunt resistance R11 to a normal amplifier/output stage. If a rectifier MR1 be joined across R11 with its negative pole to the negative busbar, then the negative alternating half cycle will be amplitude limited. If a further rectifier MR2 and shunt resistance R12 be joined in shunt with MR1 via a source of a potential $e$, such that the negative pole of MR2 is joined to the positive pole of MR1 and the positive pole of MR2 is connected to the positive pole of $e$, then amplitude limiting on both half cycles will occur at a value of $$\frac{e}{2}$$

By making $e$ variable (i. e. a low impedance potentiometer across the busbar voltage E), then the isosceles triangular alternating wave-form may be "chopped" at any angular displacement to give trapezoidal alternating waveforms. By making the angular displacement of the "chop"

$$\frac{\pi}{3} \text{ or } \frac{\pi}{5}$$

etc., in succession, the third, fifth, etc. harmonics may be made of zero amplitude in the well-known manner.

Hence if for instance the above circuit be arranged so as to deliver a trapezoidal alternating output waveform, the highest individual harmonic content will be 4% of the fifth, if the "chopping angle" is made 60°, so that the output may now be considered substantially free from harmonics and a variable frequency oscillator controllable in linear manner by a direct current input results. This means that by passing the output through a bandpass filter of bandwidth nearly 5:1, a sinusoidal output frequency change of nearly 5:1 may be obtained. Hence in tele-measurement systems it now becomes possible to transmit a number of such varying signals over the medium without resulting in interference at the receiving filters, and with a relatively large variation of each signal so that the design of the receiving apparatus becomes more simple and its performance more accurate. By comparison, if the original saw tooth waveform had been used, the output variation could not have been greater than 2:1 and the filter bandwidths would have to be the same if interference is to be avoided.

By using a number of the saw tooth waveform oscillators connected in tandem, it is possible to obtain waveforms with time which obey known laws. For instance if two be used then a square law with time results, if three then a cubic law, and so on. Such waveforms may be used in cathode ray oscillography for comparison with, and analysis of other waveforms.

In the above described embodiment of the variable frequency generator it has been assumed that the control direct current voltage was derived from some preceding apparatus not associated with the power supply E of the generator. Hence it was necessary to stabilise the charge voltage of C1 by means of the neon lamp circuit providing the grid bias for V2, in order that the output both of frequency and amplitude shall be independent of changes in E. If the input control voltage be proportional to E, there is no need for the neon lamp circuit, and the voltage across R5 is then permitted to vary with E, when the output frequency will still be independent of changes in E, but the amplitude will change proportionately. For instance, when used as a time base generator terminal 1 may be joined to the positive busbar via a suitable resistance R8 by strapping terminals 1 and 11, so that the input control is proportional to E. Hence the charge current through C1 will now be also proportional to E, but since the charge voltage is also proportional if the neon lamp is deleted by removing the strap between terminals 12 and 13, it follows that the periodic time of charge remains unaltered.

A schematic output stage V4 with cathode resistance R13 and anode load L is also shown in Fig. 2, together with means for adjusting the bias voltage $e$ on the rectifier amplitude limiters at R15.

It has been explained that the waveform across R9 can be considered as having isosceles formation owing to the very small discharge time of the original saw tooth waveform; for the same reason it can be considered as having the same frequency and that the input waveform to V4 is chopped by the amplitude limiters MR1 and MR2 at a convenient voltage as determined by $e$ such that any given odd harmonic may be eliminated.

The purpose of R10 is to prevent any substantial reduction of the load R9 on valve V3, when the limiting action is operating, and in order that the limiting may be of similar type on both half cycles, it is necessary that the impedance of the source $e$ shall be low.

As regards the desirability of the fundamental frequency being a true linear function of the input control, this is of importance in certain applications. For instance when the invention is used as the generator source for the harmonics of the pitch frequency, or other distinguishing feature of the voice, such as in speech synthesizers like the "Vocoder," the characteristic of this apparatus must be capable of working properly with that of the sending apparatus which analyzes this distinctive feature of the voice. If the characteristic laws of the two ends are not the same then a considerable amount of fitting of the two characteristics must be employed, if considerable distortion is not to result. This means repeated testing at two or more frequencies from end to end, and even so the adjustments only hold good for a specific overall gain setting. If the characteristics are convex when frequency is taken as the abscissae, as is commonly the case, then large errors can result from quite small changes in the gain (such as +3 db.). If the characteristics are linear as in the invention, then gain changes are only reflected in corresponding proportional errors of frequency from the reception apparatus. Furthermore, the setting up process and maintenance now become only a matter of gain; once the latter has been readjusted at any frequency, the overall reproduction at all frequencies is restored to normal.

On the other hand there is nothing to prevent the application of control voltages which are a non-linear function of some desired variable, and with different ends in view. For instance the use of two or more generators in tandem, for the production of specific frequency or time laws, is a case in point, as mentioned in the specification.

As regards the use of the output across C1, and particularly when the waveform is modified by Fig. 2, for the purposes of a low harmonic content oscillator, the use of the invention then lies in its capabilities as a transmitter of information, which the deficiencies of the medium prevent being transmitted as a direct current. Such a use is analogous to the well known transmission by frequency modulation methods, in that having selected the desired range of frequencies at the reception apparatus by linear methods, the conversion from frequency into D. C. effect may use prior amplitude limiting. Hence not only are attenuation changes of the medium thereby rendered ineffective, but the effects of interference from other transmissions, or from random sources, are converted into phase errors, with corresponding reduction in their effect on the reproduction accuracy. This system, known under the general title of tele-measurement is in effect a reversed "Vocoder" transmission.

However, and as pointed out, if it is desired to pass several such transmissions over a given medium, not only must the frequency band of one not impinge on another, but any harmonics of the one must not lie within any other band, if the selection at the receiver is to be at all practicable by linear means such as bandpass filters. Coupled with this is the additional requirement that the transmitted range of frequencies per band shall be reasonably large in order to avoid excessive receiver complication and maintenance. It follows therefore that the transmitted frequencies must be as pure as possible as regards low order harmonics, and with the described arrangements it is possible to obtain nearly a 5:1 operation band per channel, as compared with a 2:1 band for the unmodified output of the generator to Fig. 1.

I claim:

1. A relaxation oscillator comprising a condenser, a thermionic valve of the constant current type including a cathode and an anode, a source of direct current, said condenser being connected between said anode and the positive terminal of said source, said cathode being connected to the negative terminal of said source, said condenser thereby being charged at a uniform rate, a gaseous discharge tube including a cathode, an anode, and a control electrode, the anode of said gaseous discharge tube being connected to the positive terminal of said source, the cathode of said gaseous discharge tube being connected to the junction between said condenser and the anode of said valve, said condenser thereby being discharged when it reaches a predetermined potential, a potentiometer connected across said source, a connection between an adjustable tap on said potentiometer and the control electrode of said gaseous discharge tube whereby the potential attained by said condenser prior to its discharge through said gaseous discharge tube may be varied to control the amplitude of the oscillations, and a second gaseous discharge tube connected across a portion of said potentiometer to prevent variations in the amplitude of the oscillations with changes in the voltage of said source.

2. A signal generator comprising a first means arranged to produce a unidirectional current of saw tooth waveform, a second means coupled to said first means for eliminating the direct current component from the output thereof and producing an alternating current of sawtooth waveform, a full wave rectifying means coupled to said second means in such a manner as to convert the alternating current of sawtooth waveform derived therefrom into a pulsating current of triangular waveform with sides of equal slope.

3. A signal generator comprising a source of direct current, a condenser and a thermionic valve of the constant current type serially connected across said source to thereby charge said condenser at a uniform rate, a gaseous discharge tube connected across said condenser to discharge it when it reaches a predetermined potential whereby a voltage of sawtooth waveform is developed across said condenser, a full wave rectifying means coupled between the negative terminal of said source and said condenser to convert said voltage of sawtooth waveform into a periodic direct current voltage of triangular waveform with sides of equal slope.

4. A signal generator comprising a first means arranged to produce a unidirectional current of sawtooth wave form, a second means coupled to said first means for eliminating the direct current component from the output thereof and producing an alternating current of sawtooth wave form, a full wave rectifying means coupled to said second means in such a manner as to convert the alternating current of sawtooth wave form derived therefrom into a pulsating direct current wave having the form of an isosceles triangle, a limiting means coupled across the output of said full wave rectifying means to limit the amplitude of said isosceles triangular wave form and converting it to produce a resultant alternating wave form equivalent to an isosceles trapezoid.

5. An oscillation generator comprising a condenser, a thermionic valve with an anode, a cathode and a control electrode, a potentiometer, a source of current, said potentiometer connected across said source of current, a tap on said potentiometer connected to the cathode of said thermionic valve to provide adjustable biasing voltage and negative feedback to improve the constant current characteristics of said valve, said condenser connected between the positive terminal of said source and to the anode of said thermionic valve, means for applying a variable control potential between said control electrode and the negative terminal of said source to control the condenser charging current and oscillation frequency, a gaseous discharge valve including an anode, a cathode and a control grid, a resistance, said resistance connected between the positive terminal of said source and anode of said gaseous discharge valve to provide a loading thereto, the cathode of said discharge valve connected to the junction between said thermionic valve and said condenser to provide a discharge path across said condenser when it becomes charged to a predetermined potential, a second resistance, a second potentiometer, said second resistance and said second potentiometer connected in series and across said source with the potentiometer connected to the positive terminal of said source, a connection between the control grid of said gaseous valve and a variable tap on said last potentiometer to thereby control the amplitude of charge in said condenser prior to discharge through said last valve, a second gaseous valve, said second gaseous valve connected in parallel to said last potentiometer to thereby prevent amplitude variations of the oscillations with a variation in the voltage of said source.

6. A signal generator comprising a source of direct current, a condenser, a constant current thermionic valve and said condenser serially connected across said source to thereby charge said condenser at a uniform rate, a gaseous discharge valve including a control grid, said gaseous discharge valve connected across said condenser to discharge said condenser when charged to a predetermined potential, a potentiometer, a second gaseous valve, said potentiometer connected across said source, said last gaseous valve connected across a portion of said potentiometer to prevent voltage variation therein when said source voltage changes, a connection between an adjustable tap on said portion of said potentiometer and the control grid of said first gaseous discharge valve whereby the potential across said condenser may be regulated prior to discharge and to prevent variations in amplitude of the sawtooth wave derived therefrom with variations of the source voltage, a second condenser, a full wave rectifier means with a loading attached thereto, one terminal of said secondary condenser connected to the junction of said thermionic valve and said first gaseous valve to isolate the direct current from the said sawtooth wave, said full wave rectifier means connected between the remaining terminal of said last condenser and the negative terminal of said source to rectify therefrom said sawtooth wave and produce a wave form equivalent to an isosceles triangle.

7. A signal generator such as claimed in claim 3 in which said rectifying means is coupled to said condenser by means of a cathode follower circuit and a transformer.

BERTRAM MORTON HADFIELD.

REFERENCES CITED

The following references are of record in the file of this patent:

UNITED STATES PATENTS

| Number | Name | Date |
|---|---|---|
| 2,052,183 | Lewis et al. | Aug. 25, 1936 |
| 2,053,536 | Schlesinger | Sept. 8, 1936 |
| 2,059,904 | Leeds | Oct. 27, 1936 |
| 2,078,644 | Swedlund | Apr. 27, 1937 |
| 2,114,938 | Puckle | Apr. 19, 1938 |
| 2,123,011 | Keyston et al. | July 5, 1938 |
| 2,129,036 | Schlesinger | Sept. 6, 1938 |
| 2,149,077 | Vance | Feb. 28, 1939 |
| 2,230,926 | Bingley | Feb. 4, 1941 |
| 2,251,851 | Moore | Aug. 5, 1941 |
| 2,266,516 | Russell | Dec. 16, 1941 |
| 2,280,733 | Tolson | Apr. 21, 1942 |
| 2,282,130 | Hadfield | May 5, 1942 |
| 2,282,340 | Pieplow | May 12, 1942 |
| 2,355,363 | Christaldi | Aug. 8, 1944 |
| 2,453,787 | Downs | Nov. 16, 1948 |